Nov. 25, 1958 — K. B. BREDTSCHNEIDER — 2,861,770
CONDUIT GATE VALVE
Filed Oct. 16, 1952 — 3 Sheets-Sheet 3

Inventor.
Kurt B. Bredtschneider,
By Joseph O. Lange, Atty.

2,861,770
Patented Nov. 25, 1958

2,861,770

CONDUIT GATE VALVE

Kurt B. Bredtschneider, Chicago, Ill., assignor to Crane Co., Chicago, Ill., a corporation of Illinois Application October 16, 1952, Serial No. 315,110

5 Claims. (Cl. 251—167)

This invention relates generally to gate valves and, more particularly, is concerned with a conduit type of gate valve construction in which wedging means are employed to provide fluid tightness or a seal at the valve seats after predetermined movement of the closure member in either direction.

In order to have a better appreciation of the relative merit and significance of this contribution, it should be understood that heretofore while similar constructions have been employed, such as that shown on U. S. patent application Serial No. 252,322, filed October 20, 1951, now U. S. Patent No. 2,826,391, issued March 11, 1958, in which I am a co-inventor, such prior constructions have been costly and also have been more difficult to adjust, maintain and to repair.

It is therefore one of the important objects to provide for a valve structure of this general character which is relatively easier to install and substantially more economical to manufacture because a fewer number of milling operations are required on the discs or closure members and the wedges than heretofore.

In addition, greater life, flexibility, and ease of adjustment is provided in the pivotally mounted resilient means within the closure member as hereinafter described at greater length.

Other objects and advantages will become more readily apparent upon proceeding with a description of the invention read in light of the accompanying drawings in which Fig. 1 is a sectional assembly view of a preferred embodiment of the valve embodying my invention in the open position.

Similar reference numerals refer to similar parts throughout the several views.

Figure 1:
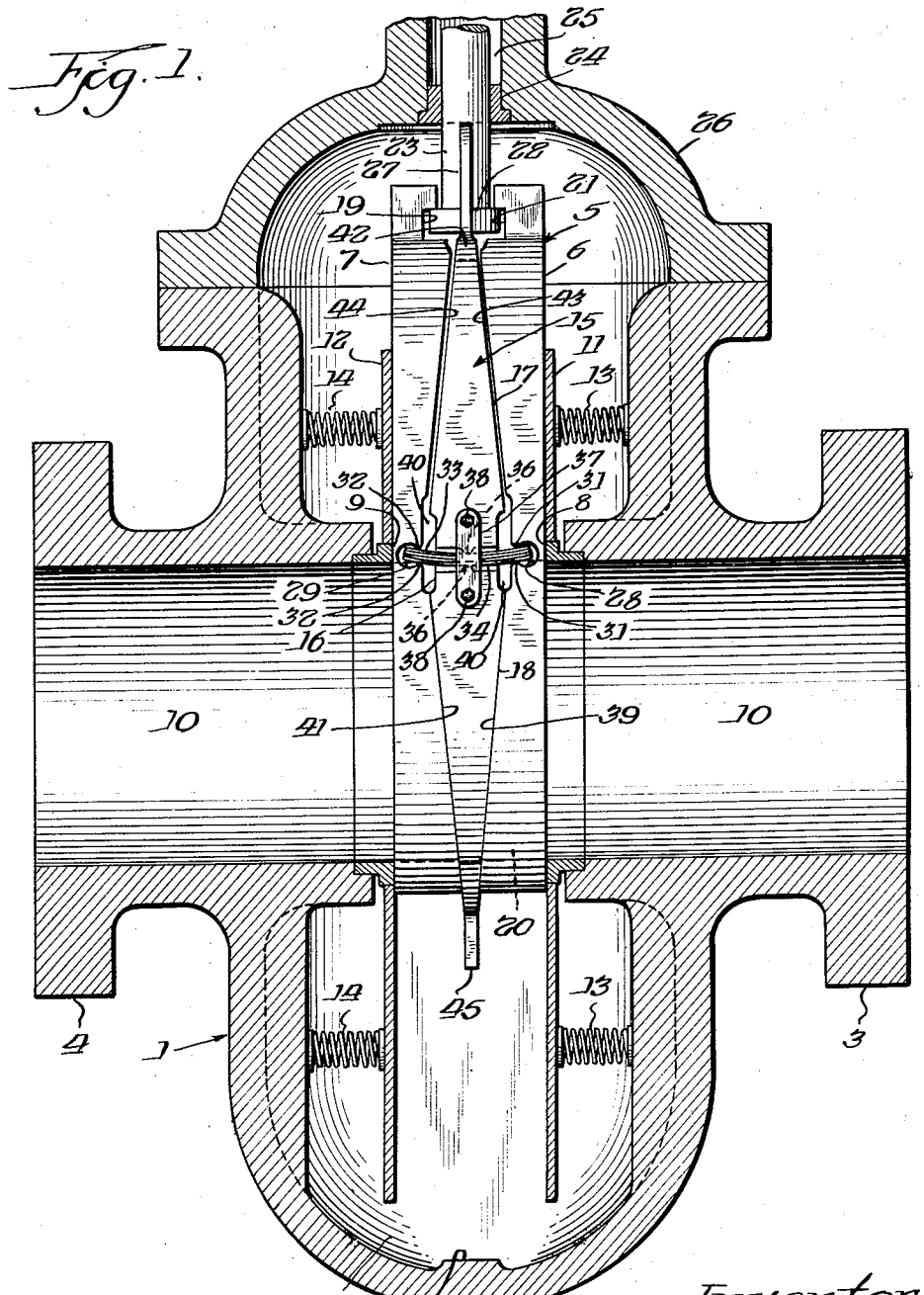

Referring now to Fig. 1, the valve body or casing is generally designated 1 having the valve chamber 2 and with the usual connecting ends 3 and 4 for suitable attachment to a pipeline (not shown). Of course, it will be understood that any form of the latter attachment may be employed without affecting the scope or the application of the invention as hereinafter described.

Within the valve chamber 2, the closure member generally designated 5 and ported as at 20 (shown more clearly in Fig. 5) is mounted. It consists of two opposite face portions 6 and 7 respectively bearing normally on the seats 8 and 9 as illustrated. As will hereinafter be clear, it may consist of more than these two portions if desired. Optionally, the latter seat members may be attached in any suitable manner, as by threading, soldering, or welding them to the casing, and, if desired, cooperate with the generally circular configuration of the seat rings. The plate-like guides 11 and 12 may be used which are shown more clearly in U. S. Patent No. 2,504,924, granted April 18, 1950, which therefore are not a part of this invention. The purpose of the plates 11 and 12 is to serve as guides for the closure member portions 6 and 7, extending beyond the diameters of the seat rings 8 and 9 and being spring loaded as at 13 and 14 thereby to draw the closure member portions 6 and 7 together at predetermined positions in the course of travel. Between the wedge portions constituting the closure member 5, a double tapered wedging member, generally designated 15, is positioned preferably having at its central portion a connecting section 16 joining the upper and lower tapered sections 17 and 18. At the upper end portion, the closure portions 6 and 7 are suitably recessed as at 19 and 21 to receive a stem head 22 integrally connected to the elongated stem actuating portion 23 projecting through a stem hole bushing 24. The latter member is mounted within the chamber 25 of the valve bonnet 26 normally forming the cover for the valve body or casing. A pair of oppositely disposed stop-fingers 27 may be provided on the central wedging member 15, as indicated, to limit the upward (opening) movement of the stem head 22 in such movement with the assembled disc portions 6 and 7, the said fingers in the fully open position contacting the said stem hole bushing 24. The fingers are integrally attached as at 42 to the disc wedge member 15.

Figure 2:
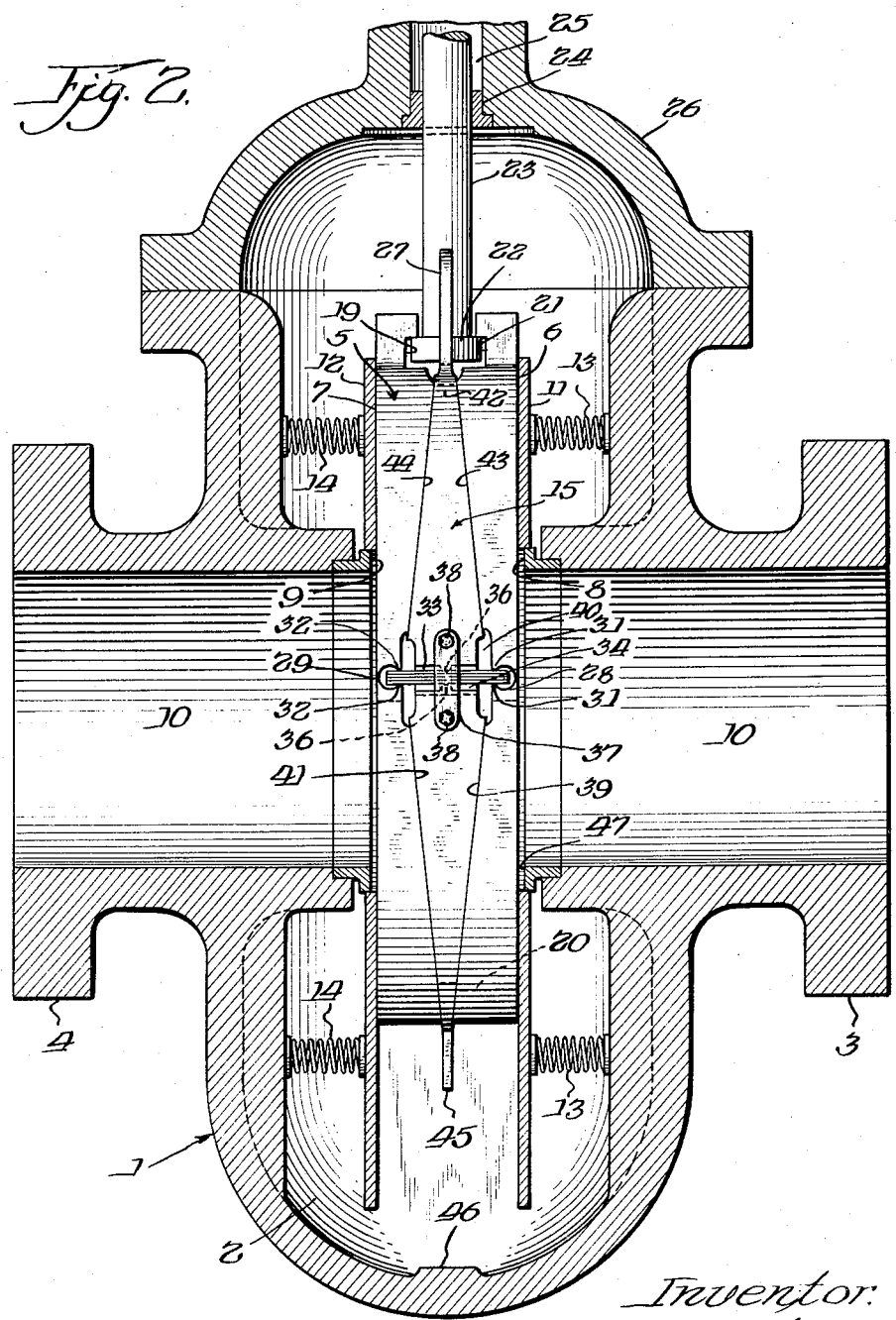
Fig. 2 is a view of the same valve described in Fig. 1, except that the valve is part-way open or in throttled position.

The novel contribution of this invention resides substantially in that portion of the structure of the valve closure assembly hereinafter to be immediately described. Referring to the disc portions 6 and 7 at the side central portions thereof, it will be noted that they are preferably transversely recessed as at 28 and 29, being enlarged at the end limits and being narrowed as at pivot points 31 and 32 to receive flexible and resilient means constituting in one preferred form a predetermined number of narrow and elongated superposed spring leaves designated 33 and which are preferably received in a transverse side recess designated 34 on the taper or wedge member 15 between the narrow portions 31 and 32 to permit a relatively snug assembly therewith. At its central portion, the recess 34 is also provided with the oppositely disposed projecting portions 36 to receive or grip the assembly of the superposed flexible leaves 33 in the same manner as described in connection with the closure structure at 31 and 32. In order to securely retain the superposed leaves 33 against side displacement and loss either during the course of assembly or during actual service, a side flange or plate 37 is used and is held by means of the cap-screws 38 against a side surface or peripheral portion of the wedge member 15. It will, of course, be understood that the structural assembly just described in connection with only one side of the disc or closure member is repeated on the opposite side thereof so as to have two sets of spring leaves mounted in the manner described. Thus it will be clear that with the valve in the wedged position, as indicated, wherein the lower wedge portion 18 bears against the surfaces 39 and 41 and the finger stops 27 have shouldered ends bearing against the lower surface portion of the member 24, the assembly of superposed leaves will be bowed or as indicated in Fig. 1. The valve is shown in the open position, that is the port 20 is in direct communication with the body ports 10. The stem is then positioned at a location in which it has been moved upward to the place in which the wedge member 15 is moved slightly transversely relatively to the closure member portions 6 and 7, thus making frictional contact at 39 and 41 and leaving a slight clearance between the wedge member and the surfaces 43 and 44 of the closure member portions 6 and 7 respectively. In the position when closing the valve, the closure member is moved transversely relative to the seats 8 and 9 with a slight amount of friction therebetween and a stop member 45 preferably positioned integrally at the lower end of the wedge member 15 contacts the lug 46 of the casing 1 as more clearly shown in Fig. 3. The spring leaves 33 will then assume the bowed position shown in the latter figure. It will be noted, as shown more clearly in Fig. 2, that when the closure member generally designated 5 has started its movement downward and is in an intermediate position, the superposed flexible leaves 33 will then assume the substantially straightened-out form shown in Fig. 2, thus preferably allowing for the springs 13 and 14 at the upper and lower portions of the casing of the chamber 2 to exert a compression load on the disc portions 5 and 6 and cause them to move in relatively close contact with the upper wedge surfaces 43 and 44 and the lower wedge surfaces 39 and 41 of the closure member portions 6 and 7. It will be clear however that the spring-loaded members 11 and 12 may be omitted in some cases. In the construction hereinabove described, it will be noted that the contact of the closure member portions at 8 and 9 is avoided and instead the guide members 11 and 12 substantially assume the frictional or sliding contact and load of the respective disc sections 6 and 7. This is a desirable condition, recognizing that the seat surfaces of the members 8 and 9 are relieved of the rubbing or abrasion which normally takes place when the valve is in a closed or seated position. This result is significant, for no one heretofore has provided a conduit valve possessing this degree of flexibility in the course of operation and further as evidenced in Fig. 3, in which the valve is shown in the closed or seated position.

Figure 3:
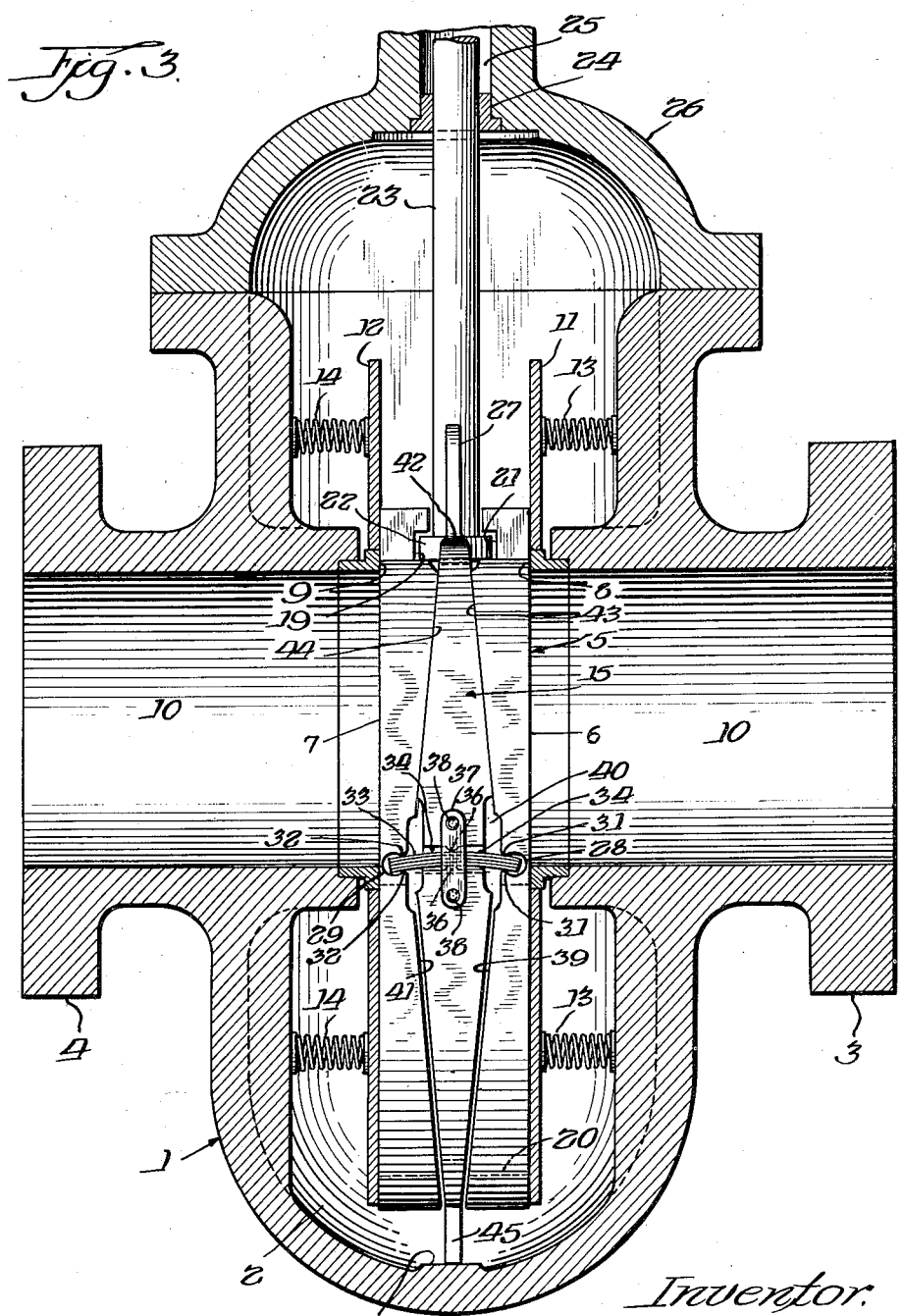
Fig. 3 is a sectional view of the structure described in connection with Fig. 1, with the valve in the fully closed position.

The closure sections 6 and 7 again are thrust outwardly by virtue of the contact of the wedge member 15 with the upper inclined surfaces 43 and 44. In Fig. 3, it will be noted that the spring leaves 33 have assumed an inverted-bowed position reverse to that shown in Fig. 1. It should also be noted that there is the further advantage that the contact of the wedge member occurs at the upper half portion of the closure member portions 6 and 7 to permit the release or de-wedging action to take place in closest proximity to the actual seating surfaces of the valve body at 8 and 9, and therefore the spring leaves 33 will allow for a desired flexible movement of the wedge member transversely to the closure members 6 and 7.

The structure is relatively simple, economical and effective in producing a retractable wedge conduit valve with guided and pivotally mounted resilient means 33.

Thus, it will be clear that a comparatively simple and economical form of structure has been provided which is susceptible of easy adjustment and repair in the course of service and is also one which imparts to a conduit type of valve the desired resilience in avoiding the usual objectionable and heavy frictional contacts previously extant between the closure member and the seats of the casing.

It will also be understood that while a preferred embodiment has been described, the elected form does not include a large number of structural elements which are also possible under or within the spirit of the invention. Therefore, the breadth of the invention should be measured by the scope of the appended claims.

I claim:

1. A valve mechanism comprising a valve casing having transverse openings therein, a valve chamber within said casing and extending transversely of the said openings, a reciprocally movable closure member within said chamber, stops at end limits of the valve chamber and casing for inhibiting the movement of the closure member, said closure member comprising opposed wedge shaped sections having their outer faces in parallel planes and their inner faces in spaced inclined converging planes, leaf-type spring means having end portions spanning and extending within oppositely disposed inner relieved portions of each of said sections, a driving wedge member between the said sections, the said driving wedge member having a relieved middle portion on oppositely disposed sides thereof forming a shoulder means for support of the said spring means at a central portion thereof; and a valve stem having a connection with oppositely disposed inner recessed portions of the said closure member, the said spring means snugly engaging said inner relieved portions of the wedge shaped sections and normally providing for the said wedge shaped sections being urged outwardly relative to said driving wedge member, the said valve stem cooperating with the said spring means and wedge shaped sections to flex said spring and whereby the said closure member is moved into open and closed positions against the stops and expanded into fluid sealing engagement with the walls of the valve chamber in such positions.

2. A valve mechanism comprising a valve casing having transverse openings therein, a valve chamber within said casing and extending transversely of the said openings, a reciprocally movable closure member within said chamber, stops for the closure member at opposite ends of the valve chamber, said closure member comprising opposed wedge shaped sections having their outer faces in parallel planes and their inner faces in spaced inclined converging planes, elongated spring means mounted on opposite side portions of said wedge shaped sections and having end limits thereof received within opposed recessed areas of each of said sections, the median portion of the spring means being firmly gripped in said side portions, a driving wedge member with oppositely disposed inclined surfaces between each of said sections, the said driving wedge member having upper and lower projections forming a relieved portion for receiving and supporting the median portion of said elongated spring means, and a valve stem having a connection with oppositely disposed inner recessed portions of the said closure member, the said spring means upon predetermined straightening and subsequent flexing providing for the said wedge shaped sections being axially moved and being urged outwardly relative to said driving wedge member, the said valve stem cooperating with the said driving wedge member and said spring means together with the said wedge shaped sections and the stops whereby the said closure member is moved into open and closed positions and expanded into fluid sealing engagement with the walls of the valve chamber in such positions.

3. A valve mechanism comprising a valve casing having transverse openings therein, a valve chamber within said casing and extending transversely of the said openings, a reciprocally movable closure member within said chamber, stop means within the chamber for inhibiting movement of the closure member at end limits of its travel, said closure member comprising opposed wedge shaped sections having their outer faces in parallel planes and their inner faces in spaced inclined converging planes, a plurality of superposed spring leaf type of resilient means with end limits thereof defined by rounded inner surfaces forming opposite relieved portions in each of said sections, a driving wedge member with oppositely disposed inclined surfaces between each of said sections, the said resilient means extending transversely to the wedge member to span side portions of the latter member and extend into said relieved portions of the sections, the said driving wedge member having at its thickest portion side disposed shoulders for snugly receiving a central portion of the said spring means, and valve actuating means including a stem with a depending head portion cooperating with oppositely disposed inner relieved portions of the said closure member and loosely engageable therewith to predeterminately abut the driving wedge member, the said spring leaf means being reversibly flexible to provide for the said wedge shaped sections being urged outwardly relative to said driving wedge member during valve actuation, the said stem depending head portion cooperating with the said spring leaf means and the wedge shaped sections whereby the said closure member is moved into open and closed positions to abut the said stop means and expanded into fluid sealing engagement with the walls of the valve chamber in such position.

4. A valve mechanism comprising a valve casing having transverse openings therein, a valve chamber within said casing and extending transversely of the said openings, a reciprocally movable closure member within said chamber, stop means in the chamber for limiting the movement of said closure member, said closure member comprising opposed wedge shaped relieved sections having their outer faces in parallel planes and their inner faces in spaced inclined converging planes, elongated spring means with ends cooperating with the relieved portions of each of said sections, a driving wedge member between each of said sections, the said spring means spanning side portions of the driving wedge member at a central thickened portion thereof, the said driving wedge member having side disposed relieved portions for support of the said spring means and having means connected to the said side portions for retaining said spring means against sideward displacement, and a valve stem engaging oppositely disposed relieved portions of the wedge sections of the said closure member, the said spring means comprising a plurality of superposed elements reversibly flexible and substantially fixedly attached as a unit to said side portions of the driving wedge member to provide for the said wedge shaped sections being urged outwardly relative to said driving wedge member upon predetermined movement of the closure member, the said valve stem cooperating with the said spring means and the wedge shaped sections whereby the said closure member is moved into open and closed valve positions against said stop means and expanded into fluid sealing engagement with the walls of the valve chamber in such positions, the said wedge shaped sections having said oppositely disposed relieved portions in substantially the same plane to receive the respective ends of the said spring means.

5. A valve mechanism comprising a valve casing having transverse openings therein, a valve chamber within said casing and extending transversely of the said openings, a reciprocally movable closure member within said chamber, stop means defining the end limits of travel of said closure member, said closure member comprising opposed wedge shaped relieved sections having their outer faces in parallel planes and their inner faces in spaced inclined converging planes, a plurality of elongated spring means having end limits terminating in reduced openings within the relieved portions on each side of said sections, a driving wedge member between each of said sections, the said driving wedge member having side relieved portions with a reduced opening therein for reception and support of the said spring means, removable retaining means for the spring means on each side of the said wedge member, and a valve stem having a head portion receivable within oppositely disposed recessed portions of the said closure member, the said spring means being snugly received in said reduced openings at a plurality of spaced apart locations along its length by said relieved sections and said wedge member to provide for the said wedge shaped sections being urged outwardly relative to said driving wedge member upon predetermined movement of the closure member, the said stem cooperating with the wedge shaped sections whereby the said closure member is moved into open and closed positions against said stop means and expanded into sealing engagement with the walls of the valve chamber upon predetermined flexing of said spring means and concurrent axial movement of said driving wedge member relative to the said relieved sections at said open and closed valve positions.

References Cited in the file of this patent

UNITED STATES PATENTS

| | | |
|---|---|---|
| 1,990,762 | Vetrano | Feb. 12, 1935 |
| 2,150,254 | Sorensen | Mar. 14, 1939 |
| 2,192,331 | Schaefer | Mar. 5, 1940 |
| 2,196,794 | Hall | Apr. 9, 1940 |
| 2,210,189 | Sorensen | Aug. 6, 1940 |
| 2,230,600 | Olson | Feb. 4, 1941 |
| 2,293,017 | Gleeson | Aug. 11, 1942 |
| 2,670,752 | Laurent | Mar. 2, 1954 |

FOREIGN PATENTS

| | | |
|---|---|---|
| 501,348 | Germany | of 1930 |
| 758,834 | France | of 1934 |